Aug. 15, 1961  D. L. ELLIS ET AL  2,996,697
LOAD INDICATING DEVICE FOR VEHICLES
Filed Nov. 30, 1959
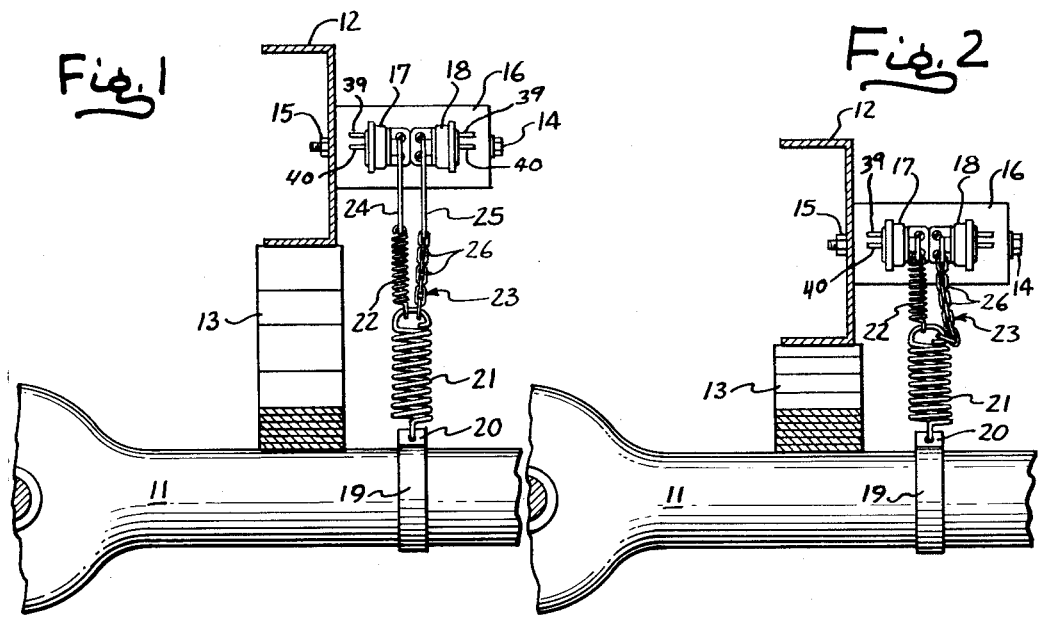
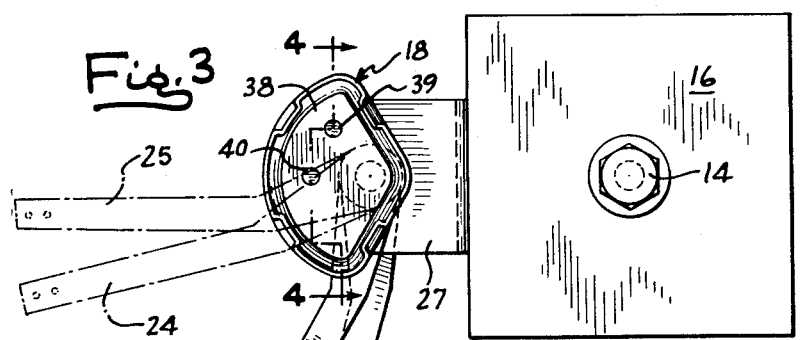
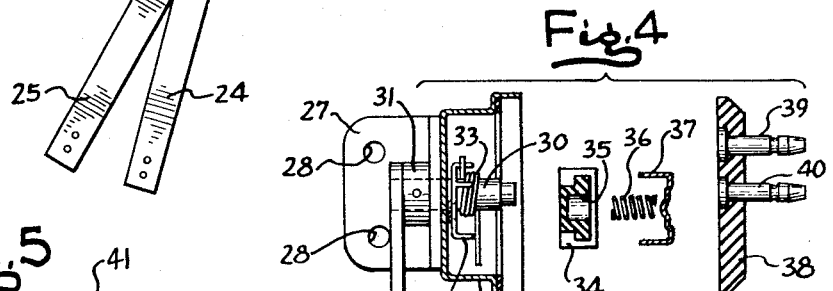
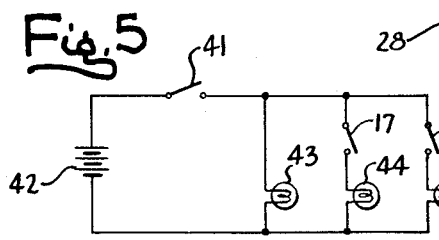
INVENTORS
DONALD L. ELLIS
ALLEN ELLIS
by: *Maur S. Camp*
ATTY.

2,996,697
LOAD INDICATING DEVICE FOR VEHICLES
Donald L. Ellis, R.R. 2, and Allen Ellis, 309 S. 1st St.,
both of Fairbury, Ill.
Filed Nov. 30, 1959, Ser. No. 856,256
6 Claims. (Cl. 340—52)

The present invention relates generally to load indicating devices mounted on load carriers such as trucks, trailers, and the like and more particularly to a device of this type which indicates when the carrier is loaded over the maximum licensed limit.

A serious problem plaguing those who operate trucks and other types of equipment which use the highways to transport a load from one location to another is the possibility of being fined for traveling with a load exceeding that which the equipment is licensed to carry. These fines can be quite large and occasionally even exceed the value of the load being carried.

In many instances the truck driver is not even aware that he is committing a violation due to the absence of a scale at the place where the truck is being loaded. However, even if there is a scale nearby a great deal of time is wasted running back and forth to the scale to determine whether or not the load limit has been exceeded. If it has not, the truck must go back to load more, for a truck cannot be operated profitably unless it carries a maximum load. If the limit has been exceeded, some of the load must be removed and the truck re-weighed. The time consumed in these activities, time in which the truck could otherwise be used to carry a load and earn money, often spells the difference between profitable and unprofitable trucking operations.

It is a primary object of this invention to provide a device mounted on the carrier which will indicate to the carrier operator when a load equals the licensed limit.

A further object of this invention is to provide means for producing a warning signal when the load has reached a weight slightly under the licensed limit. Warning means of this nature is particularly advantageous when bulk materials are being loaded on the carrier from a hopper or by means of a conveyor or other high-speed loading equipment.

More specifically, if the loading is stopped in response to an indication that the licensed limit has been reached, it is quite possible that the carrier will still be overloaded if high-speed loading equipment is being used because an interval of time will generally elapse between the moment the limit is indicated and the moment the loading is stopped, and a substantial amount of weight can be loaded with high-speed equipment during this interval, all of which will be, in excess of the licensed limit. By using a warning signal to indicate when the limit is being approached the loading can be stopped in response to this signal, and the load can thereby be prevented from exceeding the limit.

Another object of this invention is to provide a device of the type described which is readily adjustable to indicate the warning signal at a selected load different than that at which the warning signal has previously been indicated.

Still another object of the present invention is to provide a device of the type described which is simple in construction, easy to assemble, economical as to cost, and able to withstand substantial abuse.

Other objects and advantages are inherent in the structure claimed and disclosed or will become apparent to those skilled in the art from the following detailed description in conjunction with the accompanying drawing wherein:

FIG. 1 is a fragmentary front view, partially in section, of a portion of a carrier mounting an embodiment of the present invention and showing the components in the positions which they occupy when the carrier is empty.

FIG. 2 is a view similar to FIG. 1 showing the components in the positions which they occupy when the carrier is loaded.

FIG. 3 is an enlarged side elevational view, as seen from the right in FIGS. 1 and 2, showing switches and a switch mounting assembly used in the illustrated embodiment.

FIG. 4 is a partially exploded sectional view of a switch taken substantially along line 4—4 in FIG. 3.

FIG. 5 is a schematic diagram of the electrical circuit of the illustrated embodiment.

Referring to FIGS. 1 and 2 there is shown a portion of a carrier, such as a truck, having an axle 11, a load-carrying frame 12 disposed above the axle, and a spring 13 resting on the axle and mounting the frame for vertical movement in response to variations in the load carried by the frame. The load indicating device extends between axle 11 and frame 12 and comprises generally means for actuating a signal indicator in response to placement on the frame of a predetermined load.

More specifically, mounted to frame 12 by a bolt 14 and nut 15 is a block 16 in turn mounting a pair of switches 17, 18. Secured to axle 11 is a band 19 having an upwardly extending bracket portion 20 engaging one end of yieldable spring means 21 the other end of which engages one end of a link spring 22 and of a link chain 23 having a plurality of sections 26. The other end of spring 22 engages a movable arm 24 on switch 17 while the other end of chain 23 engages a corresponding arm 25 on switch 18.

Each switch 17, 18 has a pair of terminals 39, 40 one of which is connected to a respective signal indicator (not shown) and the other of which is connected to indicator energizing means (not shown) by wires not shown. When a switch arm is in the upper or closed position shown in FIG. 2, and in the dash-dot lines in FIG. 3, the two terminals on the corresponding switch are electrically connected to complete the electrical circuit between the energizing means and the respective signal indicator so as to actuate the latter.

The indicator and the energizing means are disconnected when the switch arm is moved to a downwardly extending open position, as shown in FIG. 1 and in solid lines in FIG. 3. The disconnected condition normally exists when the carrier is unloaded and the frame and axle are separated by a maximum distance because the reflection in spring 21 transmitted through link elements 22, 23 urges or pulls the respective switch arms 24, 25 to their downward open positions.

As a load is applied to frame 12 the distance between it and axle 11 decreases, and the reflection in spring 21 also decreases correspondingly. As this occurs a spring within each switch 17, 18 urges or pulls the corresponding switch arm 24, 25 upwardly towards its closed position, the attainment of which causes the indicator and the energizing means to be electrically connected.

A very simple adjustment will calibrate the device so that switch arm 24 on switch 17 will not attain its closed position until the maximum licensed load is on the carrier. First, a known load, equal to the licensed limit is put on frame 12. Then nut 15 is loosened and block 16, mounting switches 17, 18, is rotated about the axis of bolt 14. Rotation of block 16 causes a variation in the opposing pulls on a switch arm, and the block is rotated to a position in which the resultant pull on arm 24 is just enough to maintain it in its closed position. This can be determined by rotating the block and switches in a counter-clockwise direction as viewed in FIG. 3 to a position in which there is no response from the indicating means and then slowly rotating the block in the opposite direction until the indicating means gives a signal.

With the block in this position, virtually any decrease in the carried load below the licensed limit, thereby causing the frame to move upwardly and increasing the downward pull on switch arm 24, will move the switch arm from its closed position and de-energize the signal indicating means. Block 16 is secured in this position by tightening nut 15, and the device is thus calibrated to give a signal in response to a carried load equaling the licensed limit.

As previously indicated, it is oftentimes desirable to have a warning signalled when the load is slightly below the licensed limit. It is for this purpose that a second signal indicator has been provided, said indicator being connected to the energizing means through the second switch 18. When the first switch 17 has been adjusted, as described, to cause a signal in response to the loading of a licensed limit on the frame a second adjustment may be made so that arm 25 on switch 18 is subjected to less of a downward pull than arm 24.

Consequently as the load is removed from frame 12 arm 25 will be moved from its closed, signal-causing position only in response to the removal of a load greater than that necessary to be removed in order to move the first arm 24 from its closed position. Conversely, in loading the frame the load required to move arm 25 to its closed position is smaller than that required to move arm 24, thereby actuating the signal indicator connected to switch 18 before actuation of the indicator connected to switch 17 and thus indicating a warning signal before the licensed limit has been loaded on the frame.

This second adjustment is equally as simple as the first and involves merely changing the link chain section 26 which is connected to the upper end of spring 21. A change of this nature varies the slack in chain 23 when the carrier is loaded. The greater the slack the smaller the relative load required to actuate switch 18 and its corresponding signal indicator.

By changing the slack it is possible to adjust the differential between the warning signal and the limit signal in accordance with the loading conditions. For example, if the load is being applied at a rapid rate a large differential would be desirable so as to allow ample time to stop the loading equipment upon indication of the warning signal and thereby avoid the possibility of overloading the carrier before the loading can be stopped as might be the case if the warning had not been indicated relatively early.

Since the rotation of block 16 to calibrate the device will change the pull on switch arm 25 as well as on arm 24 it is apparent that arm 25 is subject to two different adjustments. One, in conjunction with arm 24, by rotating block 16, and the other, alone, by changing the link chain section 26 which engages spring 21.

An exemplification of a switch used in the present invention is shown in FIGS. 3 and 4. The switch comprises an L-shaped bracket 27 having a pair of holes 28 which receive screws for attaching the switch to block 16. Attached to one side of bracket 27 is the switch casing 29. A shaft 30 extends through aligned openings in casing 29 and bracket 27 and adjacent its outer end mounts arm 25 and a spacing collar 31 between the arm and the casing. Within the casing, shaft 30 mounts a holder element 32 and a coil spring 33 biased to urge the shaft upwardly in a clockwise direction as viewed in FIG. 3.

Holder 32 receives a block 34 composed of electrically insulating material and having a recessed portion 35 for receiving a coil spring 36. A contact element 37 fits over one side of holder 32 against spring 36 and is urged by the latter against the outer wall portion 38 of the switch. Electrical terminals 39, 40 extend through wall portion 38 which is composed of electrically insulating material. One of the terminals is connected to a signal indicator and the other terminal to the indicator energizing means. When switch arm 25 is in the open position shown in the solid lines in FIG. 3, contact element 37 is pushed against the lower electrically insulating part of wall portion 38. When the switch arm rotates upwardly to the closed position shown in dash-dot lines in FIG. 3, contact element 37 is correspondingly rotated upwardly to a position in which it is pressed against both terminals 39, 40 thereby electrically connecting the signal indicator to the indicator energizing means.

The signal indicators are preferably lamps and are mounted on the dashboard, for example, if the carrier is a truck. FIG. 5 shows a schematic diagram of an electrical circuit used in connection with the present invention. An on-off switch 41 connects one side of the energizing means 42, such as the truck battery, to one side of an on-off lamp 43, connected to the other side of the energizing means. Connected to one side of energizing means 42 through switch 41 are one terminal from each switch 17, 18, each having the other terminal connected to a lamp 44, 45, respectively. Each lamp is also connected to the other side of the energizing means to complete the circuit.

It should be noted that spring means 21 serves as a shock absorbing element for the device when the carrier is bouncing over rough terrain. There is thus provided a load indicating device which will withstand substantial abuse and the parts of which are economical as to cost, readily assembled, and easily adjusted.

It has been found that a more accurate indication of the carried load can be obtained if two rather than one of the subject devices are used. Each of the two devices should extend from respective side members of the frame downwardly to respective fastening points each located on opposite sides of the middle of the axle. Using two indicating devices in this manner prevents the carrier from being loaded unevenly on one side. More specifically, if two load indicating devices are used each can be calibrated in the manner previously described to signal in response to the placement of one-half the licensed load atop the corresponding side of the carrier frame. When one of a pair of load indicators signals a full load that signal is an indication that no more load should be placed on that side, and that any additional load should be placed on the other side, instead, until the indicator on the other side also signals a full load. If only one load indicating device is used it should, of course, be calibrated to signal in response to the placement of a full load atop the entire frame and should be located directly above the midpoint of the axle for optimum results.

It is to be understood that the specific embodiment of the invention shown in the drawing and described above is merely one of the many forms which the invention may take in practice without departing from the scope of the invention as defined in the appended claims which are to be interpreted as broadly as possible.

We claim:

1. A load indicating device for a carrier having an axle, a load-carrying frame above said axle, and spring means mounting said frame for vertical movement to various positions above said axle in response to variations in the load carried by said frame, said device comprising a pair of switches mounted on said frame, an arm on each of said switches, means mounting each of said switch arms for movement between open and closed positions thereof, a pair of signal indicating means each actuable in response to movement of a respective one of said switch arms to its closed position, spring means normally reflected to urge said switch arms to their closed positions, yieldable means connected to said axle, first link means having a first length for connecting a first of said switch arms to said yieldable means to reflect the latter and urge said first switch arm towards said open position thereof when the frame is in a first position above said axle, second link means having a second length for connecting the second of said switch arms to said reflected yieldable means to urge said second switch arm towards its open position when the frame is in a second position above said axle, and means for varying the reflections in said yieldable means and said spring means to urge said switch arms toward their respective open positions when the frame is in positions different than said first and second positions respectively.

2. A device as recited in claim 1 wherein said last recited means comprises means for simultaneously varying the reflections in said yieldable means and said spring means, said device comprising adjusting means for varying the length of said second link means to urge said second switch arm towards its open position when the frame is in a position different than said second position.

3. A device as recited in claim 2 wherein said second link means comprises a chain extending between the second switch arm and said yieldable means, means on the yieldable means for engaging said chain, and means on the second switch arm for engaging the chain, said adjusting means comprising a plurality of link sections on said chain each engageable with one of said engaging means to vary the length of said second link means.

4. A load indicating device for a carrier having an axle, a load-carrying frame above said axle, and spring means mounting said frame for vertical movement to various positions above said axle in response to variations in the load carried by said frame, said device comprising a switch, means mounting said switch on the frame in a first position for the switch wherein the latter is separated from the axle by a first distance when the frame is in a selected position above said axle, an arm on said switch, means mounting said switch arm for movement between open and closed positions thereof, signal indicating means actuable in response to movement of said switch arm to said closed position thereof, spring means on the switch and normally reflected to urge the switch arm to its closed position, yieldable means connected to said axle, first engaging means on said switch arm, second engaging means on said yieldable means, and a chain extending between both of said engaging means to connect the switch arm to the yieldable means, said chain having a selected length for reflecting the connected yieldable means and urging the connected switch arm to its open position when the frame is in said selected position, said chain having a plurality of link sections each engageable with one of said engaging means to vary said length of the chain and thereby change the reflection in said spring means so as to urge the switch arm to its open position when the frame is in a position different than selected position.

5. A device as recited in claim 4 wherein said switch mounting means comprises means mounting said switch for adjustable movement on said frame to other positions for said switch while the frame remains in said selected position, said switch when in said other positions being separated from said axle by other distances different than said first distance whereby said reflection in said connected yieldable means is varied accordingly so as to urge the switch arm to its open position when the frame is in a position different than said selected position.

6. A load indicating device for a carrier having an axle, a load-carrying frame above said axle, and spring means mounting said frame for vertical movement to various positions above said axle in response to variations in the load carried by said frame, said device comprising a switch, means mounting said switch on the frame in a first position for the switch wherein the latter is separated from the axle by a first distance when the frame is in a selected position above said axle, an arm on said switch, means mounting said switch arm for movement between open and closed positions thereof, signal indicating means actuable in response to movement of said switch arm to said closed position thereof, spring means on said switch and normally reflected to urge the switch arm to its closed position, yieldable means connected to said axle, and link means connecting the switch arm to the yieldable means, said link means having a selected length for reflecting the connected yieldable means and urging the connected switch arm to its open position when the frame is in said selected position, said switch mounting means comprising means mounting the switch for movement on said frame to other positions for the switch while the frame remains in said selected position, said switch when in said other positions being separated from said axle by other distances different than said first distance whereby the reflection in said connected yieldable means is varied accordingly so as to urge the switch arm to its open position when the frame is in a position different than said selected position.

References Cited in the file of this patent

UNITED STATES PATENTS

| | | |
|---|---|---|
| 1,147,127 | Troll | July 20, 1915 |
| 2,181,277 | Labbe | Nov. 28, 1939 |
| 2,779,013 | Chotro | Jan. 22, 1957 |
| 2,842,633 | Roach | July 8, 1958 |

FOREIGN PATENTS

| | | |
|---|---|---|
| 57,349 | Denmark | Feb. 19, 1940 |
| 1,008,431 | France | Feb. 20, 1952 |